H. L. McAVOY.

Apparatus for Carbureting Air.

No. 3,225.

Reissued Dec. 8, 1868.

Witnesses:

Inventor:

H. L. McAvoy

By Munn & Co

Attorneys

N. PETERS, Photo-Lithographer, Washington, D. C.

United States Patent Office.

EDMON L. MIX, OF ROCHESTER, NEW YORK, AND THE MONUMENTAL AUTOMATIC GAS-MACHINE COMPANY, OF BALTIMORE, MARYLAND, ASSIGNEES, BY MESNE ASSIGNMENTS, OF HUGH L. McAVOY.

*Letters Patent No.* 46,302, *dated February* 7, 1865; *reissue No.* 3,225, *dated December* 8, 1868.

IMPROVED APPARATUS FOR CARBURETTING AIR.

The Schedule referred to in these Letters Patent and making part of the same.

*To all whom it may concern:*

Be it known that HUGH L. McAVOY, of the city and county of Baltimore, in the State of Maryland, invented a new and improved Mode of Carburetting Air; and that the following is a full and exact description of the same, reference being had to the accompanying drawings, making part of this specification, in which—

Similar letters of reference indicate corresponding parts in the two figures.

Figure 1:
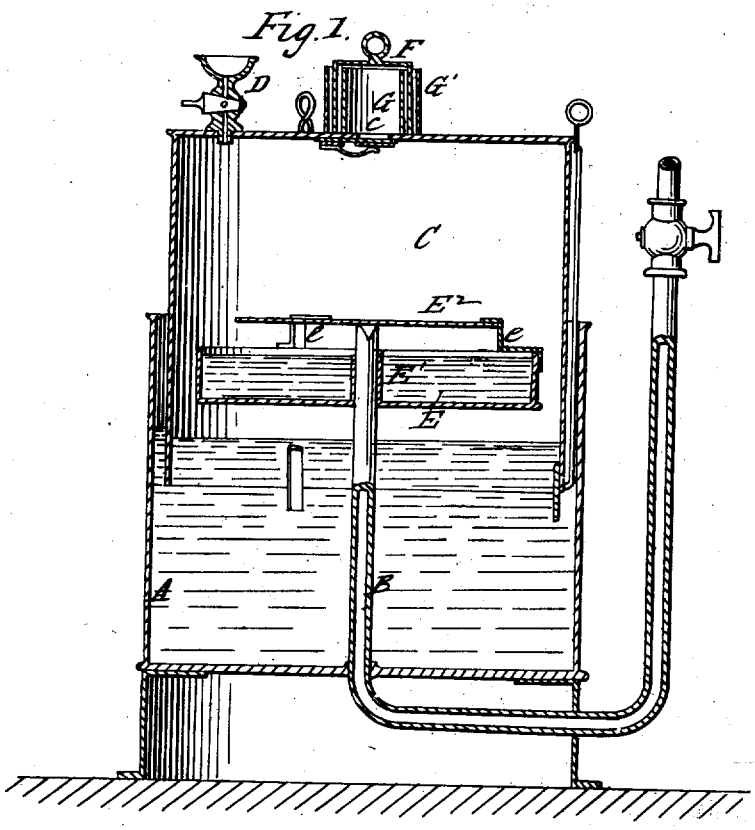
Figure 1 is a plan of an apparatus illustrative of the invention, a part being broken away, to expose the interior.
Figure 2:
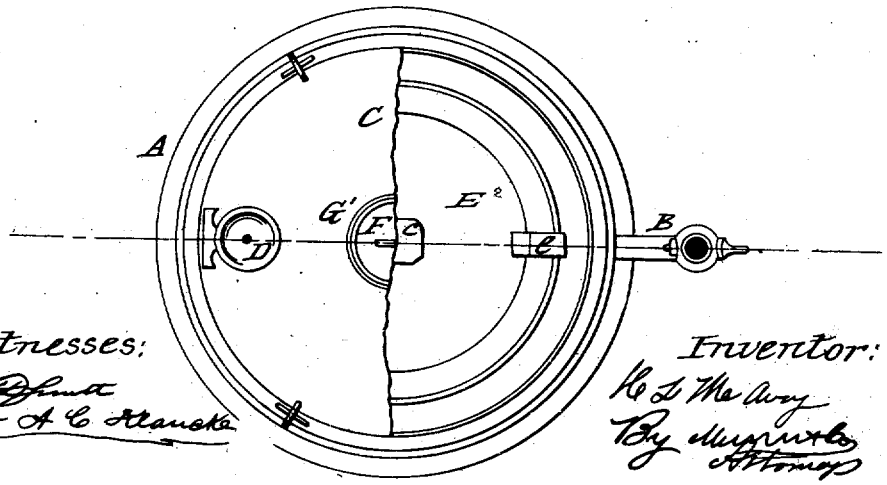
Figure 2 is a vertical central section of the same.

The principal feature of novelty and utility in this invention consists in enclosing the hydrocarbon-liquid to be vaporized within an air-forcing apparatus, comprising a gravitating air-holder, and a tank or vessel containing the water, which isolates the contents of said air-holder.

This feature enables a gas-machine of the kind in question to be constructed in a more compact, simple, and cheap manner than any mode of construction devised prior to this invention.

Another feature of this invention is the mode, hereinafter described, of carburetting atmospheric air without subjecting it to a forced passage through or to mutual agitation with the hydrocarbonaceous liquid.

It has been ascertained, by very successful experiment, that air-gas of a superior illuminating character may be made by a much more simple and less expensive process than any hitherto devised.

In order that others skilled in the art to which the invention appertains, may be enabled to fully understand and use the same, the following description is given.

A represents a vessel, of any desired capacity, and B, a pipe which receives the gas at top, and conducts it off to be burned.

C represents an air-holder, having a valve, *c*, through which the holder is supplied with air automatically, on being raised.

Through a cock, D, oil may be introduced into the vessel A. The vessel A may be first supplied with a quantity of water, and then hydrocarbonaceous liquid or oil is poured into the vessel, until it reaches any desirable point below the open top of the pipe B, which extends upward in the vessel, to within a short distance of the top of the latter. The oil overspreads the surface of the water, and being the lightest, is sustained thereon. Evaporation ensues as soon as the holder C is discharged, and the air contained therein becomes mixed with the vapor, thereby being converted into gas capable of affording a brilliant light. By the gravitation of the holder C, the gas thus formed is forced out through the pipe B, to be consumed, or to be received into a suitable retainer.

E represents a pan, of any suitable form and dimensions, having a central sleeve, $E^1$, fitting over the pipe B. A plate or cover, $E^2$, attached to the pan E by arms *e e*, rests upon the top of the pipe B, retaining the pan in an elevated position, near the top of said pipe B, the latter being notched, to allow the gas to pass into it, around its upper edge, when the pan E is used. This pan E may be filled with oil, instead of pouring the latter directly upon the water, and may be employed to cause the air, in its passage to the pipe B, to move in contact with the oil, under such degree of pressure as may be desired. It will be seen that while the pan E and plate $E^2$ may be used advantageously, they are not indispensable.

The above method is equally well adapted for carburetting air, and enriching carburetted hydrogen. The fluid may be introduced through the top, or from a reservoir. The residuum can be drawn out by a siphon, or pumped out by any suitable mode.

The employment of water in the vessel A excludes external air from entering the holder, and confines the gas, while it serves the additional purpose of maintaining an equable temperature of the hydrocarbon-fluid, and thereby promotes its uniform volatilization. The pan E may be permanent, as described, or it may be adapted to float in or upon the water.

A seal, consisting of an inverted cup, F, with its lower edges submerged in suitable liquid contained in the annular space between two cylinders, G G′, may be located on the top or at the side of the holder C, and over an opening therein.

When the cup F occupies its lower position, that is to say, when its lower edge is submerged, no air can escape from the holder C, but when, in the act of raising the holder, the cup F is elevated, so that its lower edge occupies a point above the surface of the water, between cylinders G G′, the external air has free ingress to the holder through the opening which is sealed by the cup when down. This sealing-device may be employed alone, or in connection with the valve *c*, both being adapted for the same purpose. The cup F can be raised in any convenient manner.

Above are described two ways of carrying out the first feature of the invention, namely, first, by using the water-tank A as a receptacle for the hydrocarbon-liquid, and secondly, by the employment of a separate and distinct vessel or receptacle, E, for containing the said hydrocarbon-liquid.

So far as the main feature of the invention is concerned, it matters not whether the oil-containing vessel be constructed as shown, or in any other manner, so long as the oil to be vaporized is contained within an ordinary gasometer, or air-holding or forcing vessel containing water at the bottom. Thus any carburetter or oil-containing vessel may be substituted for the pan E.

The air-holder may be supplied with air in any manner other than that herein described, the chief features of the invention not being dependent upon any special means for supplying said holder.

Having thus described the invention,

The following is what is claimed as new, and the invention of said McAvoy:

1. An apparatus for manufacturing air-gas and enriching other gas, in which the carbonaceous matter is enclosed within an air-forcing apparatus, consisting of a gravitating air-holder and water-receptacle, substantially as described.

2. Manufacturing air-gas by the described mode of using a holder, C, to contain air, receive the carbonaceous matter as it rises from the oil in the form of vapor, and force the gas into a pipe, wherein it is conducted off, as explained.

3. The plate $E^2$, employed in connection with the pan E, to cause the air to pass to the pipe B, in contact with the oil, and in a state of compressure, substantially as described.

4. The sealing-device, consisting of the cup F, cylinders G G′, and a body of liquid between the latter, substantially as described.

5. An apparatus for carburetting air, in which the vessel holding the hydrocarbon-liquid is contained within the gasometer, in contact with the water in the cistern thereof, substantially as and for the purposes set forth.

EDMON L. MIX.

J. CRAWFORD NEILSON,

*President Monumental Automatic Gas Company.*

W. S. MORETON,

*Secretary Monumental Automatic Gas Company.*

Witnesses:

N. Robinson,

H. L. McAvoy.